United States Patent [19]

Smith

[11] 4,239,551

[45] Dec. 16, 1980

[54] BRUSH ARRANGEMENT AND SEQUENCING FOR TURNTABLE CAR WASH

[76] Inventor: Judson L. Smith, 5432 Lighthouse La., Tempe, Ariz. 85283

[21] Appl. No.: 32,226

[22] Filed: Apr. 23, 1979

[51] Int. Cl.³ .............................................. B08B 7/00
[52] U.S. Cl. ......................................... 134/6; 134/18; 134/33; 15/53 AB; 15/DIG. 2
[58] Field of Search ...................... 15/DIG. 2, 53 AB; 134/6, 18, 33, 45, 123

[56] References Cited

U.S. PATENT DOCUMENTS

| | | | |
|---|---|---|---|
| 3,310,824 | 3/1967 | Beer | 15/DIG. 2 |
| 3,362,349 | 11/1968 | Kirkland | 15/DIG. 2 |
| 3,451,085 | 6/1969 | Hay | 15/53 AB |
| 3,510,898 | 5/1970 | Tatara et al. | 15/DIG. 2 |
| 3,797,059 | 3/1974 | Smith | 15/DIG. 2 |
| 4,003,391 | 1/1977 | Smith | 134/6 |

*Primary Examiner*—S. Leon Bashore
*Assistant Examiner*—Michael L. Goldman

*Attorney, Agent, or Firm*—Woodard, Weikart, Emhardt & Naughton

[57] ABSTRACT

Vehicle washing apparatus includes a turntable for reception of a vehicle on it at an entrance point. Two arm and brush assemblies are provided at opposite sides of the path of the vehicle onto the turntable to scrub upstanding exterior body surfaces of the vehicle. The turntable is rotated with the vehicle on it, as the brushes are moved by the vehicle body surfaces and scrub the entire perimeter of the vehicle at least once with both brushes, using a 360 degree rotation of the turntable. Articulated brushes, in one embodiment, are employed with brush reversal for additional brushing of the rear end as the vehicle is moved off the turntable. Oscillating friction strips are provided at the entrance for cleaning top surfaces of the vehicle, and a dryer unit is provided at the exit point for drying the vehicle. Conveyors are employed at the entrance and exit points as well as on the turntable itself, for conveyor movement of the vehicle, if desired.

23 Claims, 20 Drawing Figures

BRUSH ARRANGEMENT AND SEQUENCING FOR TURNTABLE CAR WASH

BACKGROUND OF THE INVENTION

1. Field of the Invention

This invention relates generally to vehicle cleaning equipment, and more particularly to apparatus in which rotary scrubbing devices on overhead arms scrub the vehicle surfaces as relative rotation is established between the array of scrubbing devices and the vehicle.

2. Description of the Prior Art

Vehicle washing apparatus including means for relative rotation between a vehicle and scrubbing devices are known. Examples of some of the prior art include my earlier U.S. Pat. Nos. 3,797,059 issued Mar. 19, 1974 and 4,003,391 issued Jan. 18, 1977, both of which were based upon an original application filed Oct. 12, 1971. That application disclosed a turntable supporting a car and rotating the car as various brushes were applied to various surfaces. The brushes applied to the verticle surfaces of the car were mounted on carriages supported on rails. Separate overhead brushes cleaned the top of the car. An arm-mounted brush on a vertical axis was provided for washing the rear ends of station wagons or the like. A conveyor was provided on the turntable to move the car onto and off the turntable.

In my above mentioned patents, there were cited earlier prior art U.S. patents including turntables for rotating a car in a horizontal plane. These included a Kirkland U.S. Pat. No. 3,362,349; Hay, U.S. Pat. No. 3,451,085; Tatara et. al., U.S. Pat. No. 3,510,898; Beranek, U.S. Pat. No. 3,011,501; and Dawson, U.S. Pat. No. 3,685,079. I believe my above mentioned earlier patents are closer to my present invention, than were any of the prior art references cited in those patents. Yet there has remained a need for simple apparatus capable of adequately cleaning all the surfaces of the car in comparatively short time with friction devices of the bristle type or of a strap or strip-type such as shown in the Fromme U.S. Pat. No. 3,683,441 issued Aug. 15, 1972. The present invention is directed towards meeting that need.

BRIEF SUMMARY OF THE INVENTION

Described briefly, according to a typical embodiment of the method of the invention, the vehicle is moved onto a turntable. As it is moved on, the front is power scrubbed by rotating friction devices. Then, the rotation of the turntable commences while the friction devices continue to scrub the vehicle and move along the front and sides and rear as the vehicle rotates. When the rotation of the turntable has ceased, the vehicle has been scrubbed on all external vertical body surfaces thereof and continues to be scrubbed as it is moved off the turntable. To assist in the repetition of scrubbing of the rear as the vehicle moves off the turntable, at least one of the scrubbing devices is reversed in rotation to move across and scrub the rear of the vehicle as it is moved off the turntable.

DETAILED DESCRIPTION OF THE DRAWINGS

Figure 1:
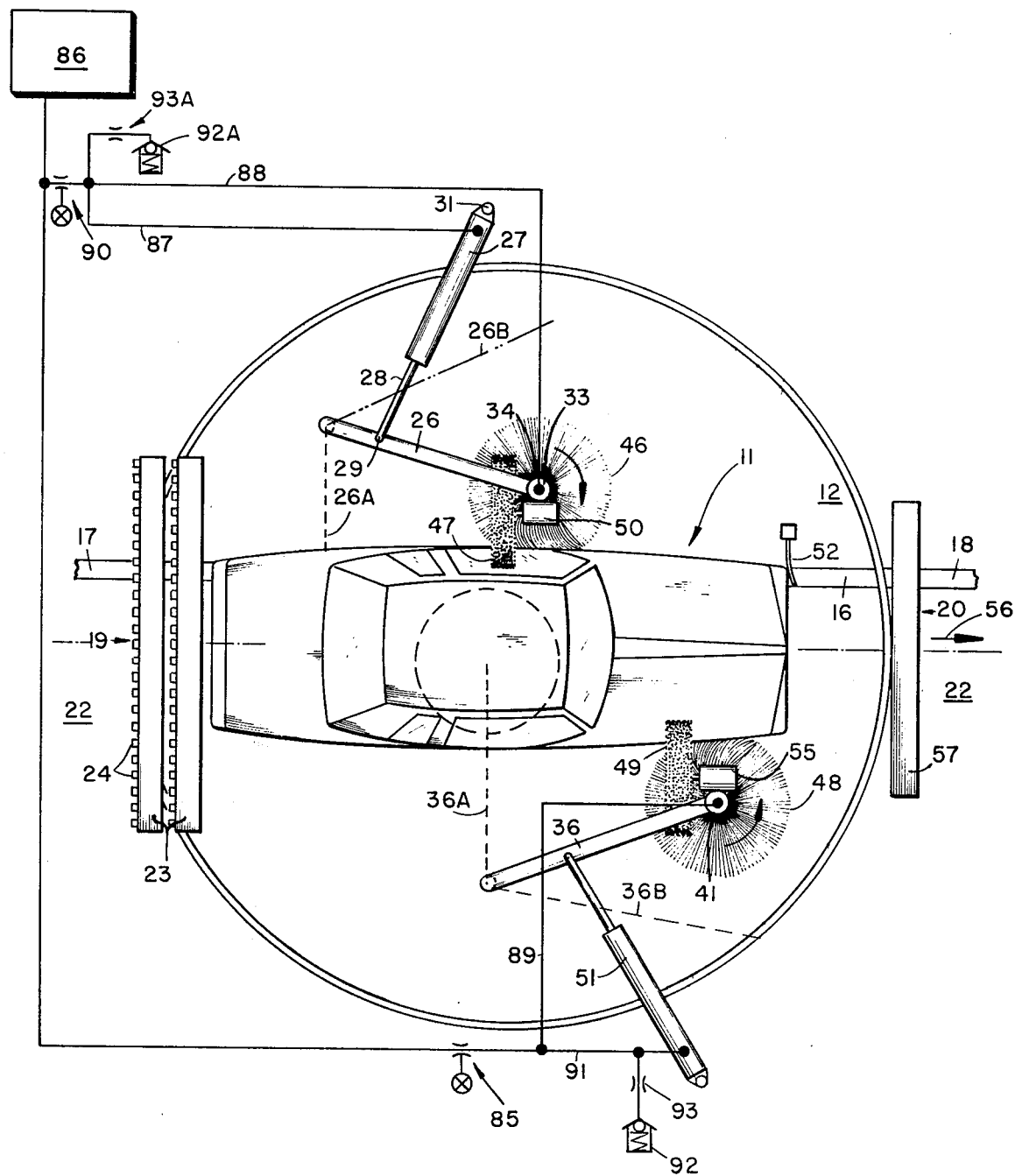
FIG. 1 is a top plan view showing a brush arrangement in accordance with a typical embodiment of the present invention.
Figure 2:
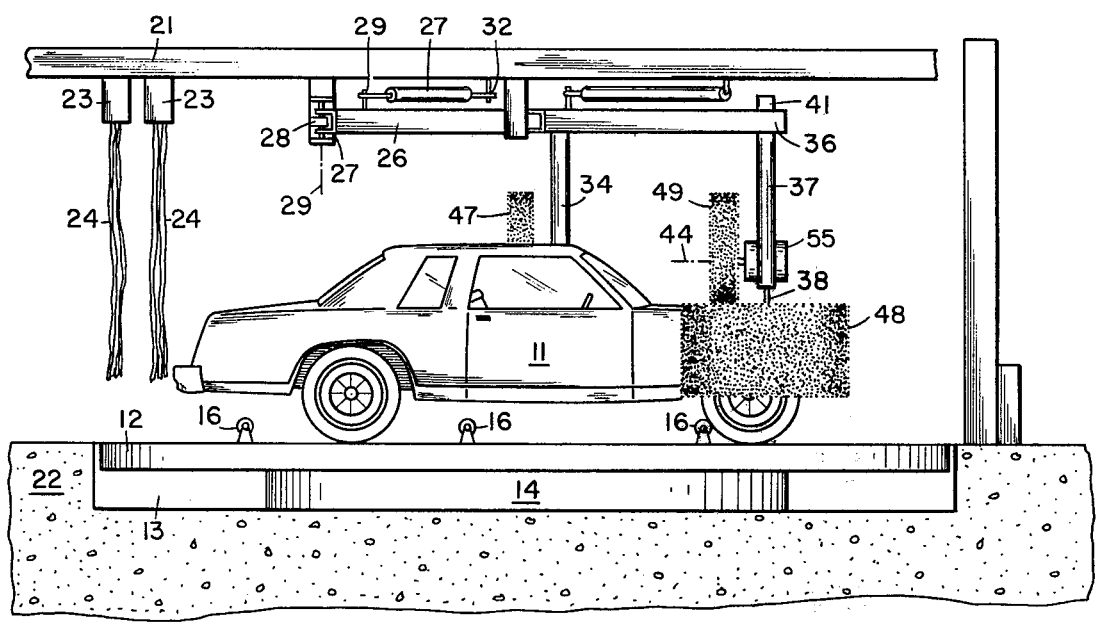
FIG. 2 is a side elevational view thereof.

Referring now to FIGS. 1 and 2, there is shown an automobile 11 resting upon a turntable 12 mounted for rotation in a well 13 with rotating drive mechanism being provided in a housing 14. The turntable has a conveyor 16 thereon cooperable with an input conveyor 17 and exit conveyor 18 for moving the vehicle onto and off the turntable. Details of the conveyors and turntable rotating mechanism are not disclosed herein, as they are not a part of the present invention, and such devices are well known in the art. A suitable turntable mounted conveyor is disclosed in my aforementioned patents, and other conveyors which could be used are known and disclosed in the art. Some examples are disclosed in the patents cited in my above mentioned patents.

It is preferable that an entrance be defined and that is related to the brush array. Therefore, the entrance to the brush array is at 19, with the brushes illustrated being mounted at the distal ends of arms which are pivotally mounted to an overhead structure 21 which is stationary relative to the ground 22. At the entrance, overhead housings 23 may be provided with suitable mechanism for support and oscillation of a plurality of downwardly hanging scrubbing strips 24 which are arranged in two sets, one nearer the entrance than the other, as best shown in FIG. 2. The strips may be of a type disclosed in the Tatara et. al. U.S. Pat. No. 3,510,898 or the Fromme U.S. Pat. No. 3,683,441. Suitable arrangements and mechanisms are known in the art, and will not be detailed herein.

The arms supporting the brushes are substantially identical, so a description of one could suffice for both. Left-hand arm 26 (so-named because it supports brushes at the left-hand side of the center of the path of the vehicle) has a yoke portion 27 mounted in a bracket 28 affixed to the superstructure 21. The arm is pivotally mounted to the bracket so as to pivot about a vertical axis 29 from a home position shown by the dotted outline 26A, to essentially a maximum outboard position indicated by the dot/dash outline 26B. A hydraulic cylinder 27 has the piston rod 28 thereof pinned to arm 26 at 29, and the cylinder is pinned at the opposite end 31 to a bracket 32 mounted to the superstructure 21. A brush drive motor 33 is mounted to the downwardly extending housing 34 affixed to the distal end of the arm 26. As is better shown for arm 36, the housing 37 affixed to the distal end of it, and corresponding to housing 34 for arm 26, extends downward a substantial distance toward the turntable 12. A shaft 38 extends out of the bottom of housing 37, and brush 48 is affixed to the shaft. This shaft is driven by drive motor 41 mounted to the top of the column or housing 37 at the distal end of arm 36.

A window cleaning brush 49 is mounted to a shaft driven by window brush drive motor 55 which is affixed to the housing 37. Accordingly, the window brush operates in rotation about a horizontal axis 44, while the brush 48 operates about the vertical rotational axis of shaft 38. The same kind of structure is employed for the mounting and drive of the left-side brush 46 and left window brush 47.

The brush 46 is normally driven in the clockwise direction as is the turntable 12, and this is indicated by the arrows shown thereon. The right-hand body brush 48 is normally driven in the counter clockwise direction. Left-hand window brush 47 is normally driven so that the bristles contacting the windows are moving in a downward direction. The right-hand brush 49 is normally driven so that its window-contacting bristle are moving upward as it washes the windows of the car.

It was mentioned that the arm 26 is movable from a home or rest position 26A to the dot/dash line position designated by reference numeral 26B. Similarly, arm 36 is movable from the dotted line home position 36A to its most remote position designated by the dot/dash line 36B. This movement is caused by action of the vehicle against the brush, and is resisted by the homeward urging force applied in a brush homing direction by hydraulic cylinder 27 for arm 26, and cylinder 51 for arm 36.

Figure 3A:
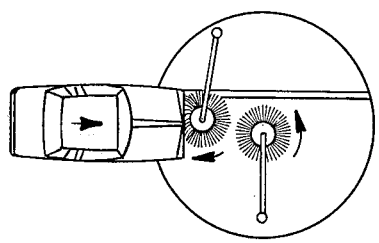
FIG. 3A through 3H are schematic top plan views showing various stages in the scrubbing of the vehicle with a pair of rotary brushes on non articulated arms.
Figure 3B:
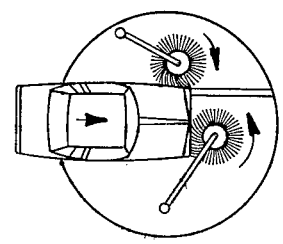

The method of operation will be described with reference to FIGS. 3A through 3H. Referring to FIG. 3A, the vehicle is being moved onto the conveyor. This can be done either with the operator in the vehicle, in which event the operator would stay in the vehicle, or strictly by means of the conveyor, with the vehicle in neutral. As it is moved onto the conveyor, the vehicle may already be wetted by water from entrance rinse nozzles or by means of the strips 24 supplied with a suds solution. The front end, which will have been wetted and partially cleaned by the laterally oscillating strips 24, engages the first brush 46, which is rotating in the clockwise direction in home position. As the vehicle is moved forward onto the turntable, brush 46 is moved outward from the center of the path of the vehicle, and the second brush 48 is encountered. This brush is rotating in the counter clockwise direction. It then is moved toward the right of the path as shown in FIG. 2B, as the vehicle is moved further onto the turntable. Both of these brushes are rotating in a direction for scrubbing from the center toward the outside of the vehicle, and both are thereby resistant to being moved outward to the side of the path of the vehicle. Accordingly, they thoroughly scrub the front of the vehicle as it is moved onto the turntable.

Figure 3C:
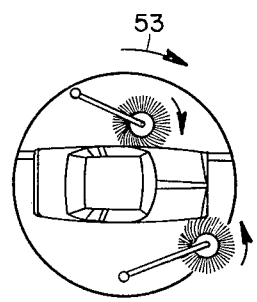
Figure 3D:
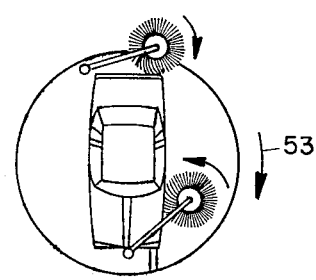

Eventually, when the vehicle is completely on the turntable, a condition shown in FIGS. 1, 2 and 3C, and which may be sensed by actuation of a wand 52 by the front end or a front wheel of the vehicle, the turntable starts to rotate in the clockwise direction of arrow 53 (FIG. 3C). As it does so, the brushes 46 and 48 continue to rotate in the same directions as they had been rotating, but the brush 48 is moved across the front of the vehicle in a direction relative to the vehicle ("relative direction") from the center toward the left-hand side of the vehicle. The direction of rotation of the bristles aid the brush 48 in moving around the surfaces while, at the same time, scrubbing the front and left side, which have already been scrubbed by the brush 46 (FIG. 3D). At the same time, as the vehicle continues to turn, the brush 46 starts across the rear end of the vehicle in a relative direction from the left side toward the right side, with the bristles continuing to work against the vehicle in the relative direction from its left side toward its right side. This resistance of the brush toward movement in the direction that the vehicle is being moved against it by the turntable, aids in the scrubbing operation. This is particularly significant across the rear of the car, which usually gets very dirty and is hard to clean with a non-articulated brush in a conventional straight-through car wash.

Figure 3E:
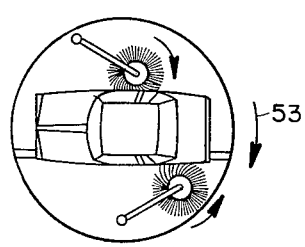

FIG. 3E shows the combination when the car has been turned 180°. It will be remembered that, as the car was moved onto the turntable, the relative scrubbing direction by the first brush 46 on the left-hand side of the car was from the left front toward the left rear. This was the direction of movement of the bristles against the car surface, as well as the direction of movement of the whole brush relative to the car itself. As the car was rotated from the position shown in FIG. 3D to the position shown in FIG. 3E, brush 48 scrubbed the left side of the car. In this instance the scrubbing is also from the front to the rear by brush 48. The direction of movement of the bristles relative to the car surface ("relative direction") is from rear to front. Meanwhile, the direction of movement of bristles relative to the right-hand side of the car by brush 46 is from rear to front as is also the direction of the movement of the brush relative to the right hand side of the car.

Figure 3F:
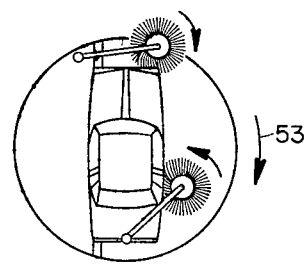
Figure 3G:
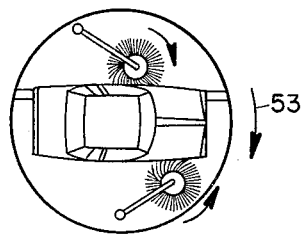
Figure 3H:
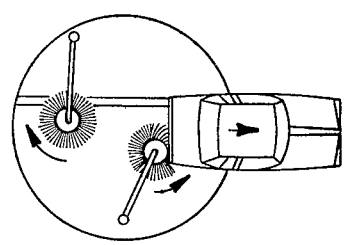

When the car has moved 270°, to the position shown in FIG. 3F, brush 48 has commenced scrubbing the right side of the car, and the bristles are moving in a direction from front to rear relative to the right side of the car while the direction of the brush relative to the right side of the car is from rear to front. Brush 46 is again brushing the front of the car from right to left as the brush itself moves from right to left relative to the front of the car as the car continues to be rotated clockwise.

When the car has rotated the full 360° (FIG. 3G), the right side has been scrubbed from rear to front by brush 48 as the bristles have moved in a relative direction from front toward rear against the car surface.

After the rotation is complete, the car can be moved off the turntable exit end 20 to the right in the direction of arrows 56 as it does so, it can pass through a dryer arch 57 to blow the water off the car and dry it.

From the foregoing description, it will be recognized that with the brushes having home position substantially aligned adjacent the center of the path of the vehicle, and between the center of the turntable and the entrance end, and swingable forwardly in the forward direction of the path of the car onto the turntable and outwardly toward the side as the car pushes them forward, the right-hand brush will brush the entire front end of the car at least one time. The left brush will brush the entire front end one time while the car is rotating on the turntable. The right brush will brush the rear of the car one time while the car is being rotated, as will the left hand brush. The left hand brush will brush the entire left and right hand side of the car one time and the right-hand brush will brush the entire left side as the car is rotated, and the entire right side as the car is moved off the turntable. The left hand brush will brush the left hand side a second time as the car is returning to the start position on the turntable and as it is moved off the turntable to the exit end. Accordingly, each side and the front and rear of the car is brushed at least twice with just one rotation of the turntable. The window brushes brush the side windows at least twice during one movement of the car onto, through one rotation, and off the turntable. If additional brushing might be needed, the turntable can be rotated additional times. That should not be necessary for 90 percent of the vehicles passing through the washing apparatus.

Figure 4:
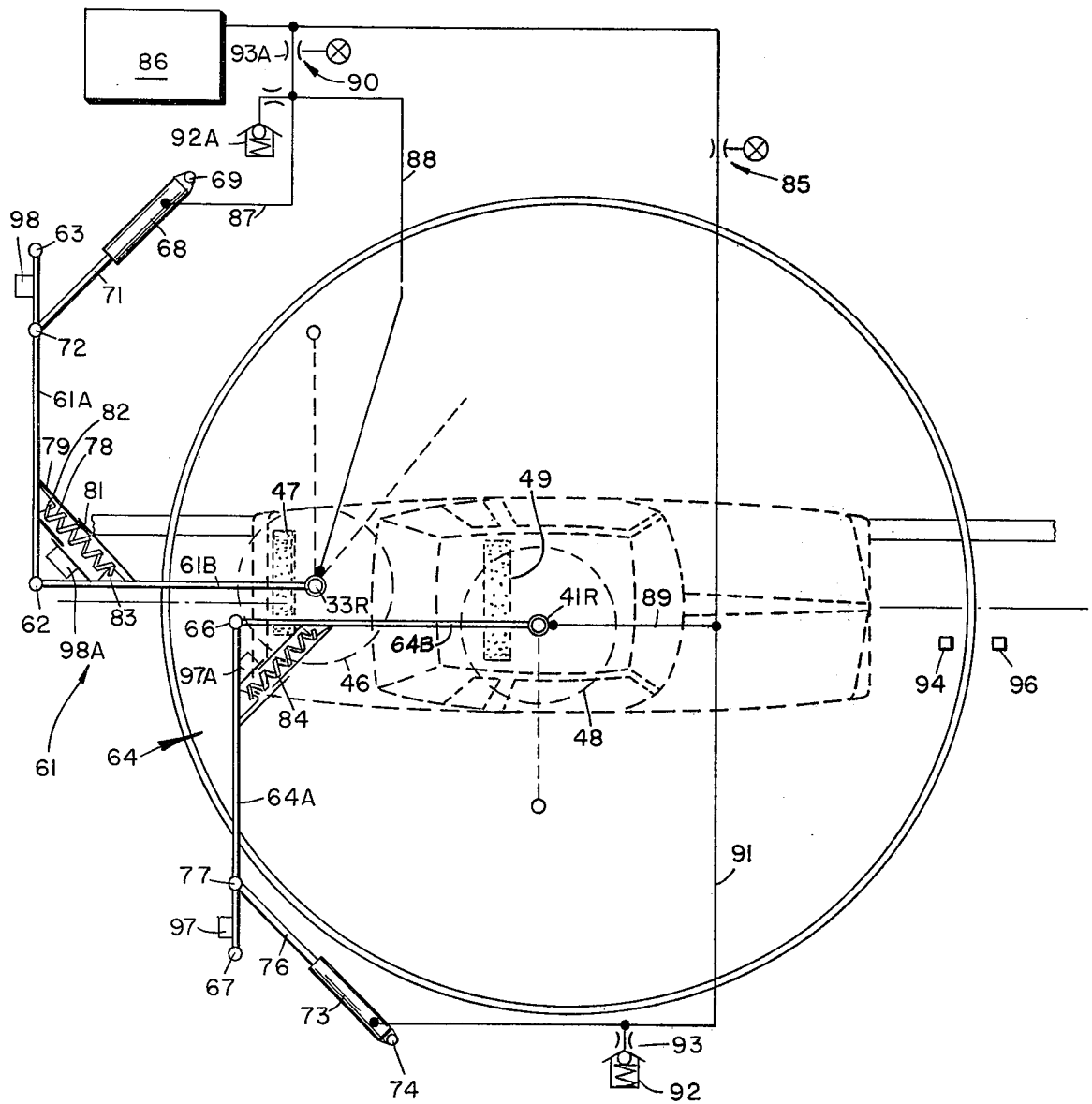
FIG. 4 is a top plan view of another embodiment, in which the brushes are mounted to articulated arms.

Referring now to FIG. 4, the whole apparatus is the same as in FIGS. 1 and 2 except for the kind of mounting arms for the brushes and the location of their pivots. The initial home position of the brushes is the same as in FIG. 1, so the same reference numerals are used for the brushes. The arms are jointed or articulated such as arm 61 which has the primary arm 61A and secondary arm 61B, jointed or hinged together at 62. Primary arm 61A is pivoted to the superstructure on a vertical axis 63, just as arm 26 was pivoted to the superstructure on a vertical axis through the bracket 28. In like manner, articulated arm 64 includes primary arm 64A and secondary arm 64B hinged together at the joint 66, with the primary arm 64A pivotally mounted to the superstructure to pivot on a vertical axis 67.

A hydraulic cylinder 68, having its rod end pinned at the superstructure on a vertical axis 69 as the piston rod 71 pinned to primary arm 61A at 72 to normally urge the arm 61 to the home position shown in the solid outline in FIG. 4. Similarly, hydraulic cylinder 73 having its head end pinned to the superstructure to pivot on a vertical axis 74, has its piston rod 76 pinned to primary arm 64A at 77. This cylinder normally urges the arm 64A toward the home position shown in solid lines in FIG. 4. A spring 78, having opposite ends received in telescoping guide tubes 79 and 81, with each of the tubes being pinned to one of the arms such as tube 79 pinned to arm 61A at 82 and guide tube 81 being pinned to arm 61B at pin 83, serve to maintain the right-angle relationship of the primary and secondary arms at most times. Some collapse of the arms can be accommodated under the resistance of the spring 78 for purposes which will be described as the description proceeds. A similar spring and guide relationship is shown for the arm assembly 64.

Cable, pulley and counterweight devices can also be used, either separately or in combination with such springs, to maintain the 90 degree relationship at most times, and constantly urge the primary and secondary arms toward the 90 degree relationship.

Figure 4A:
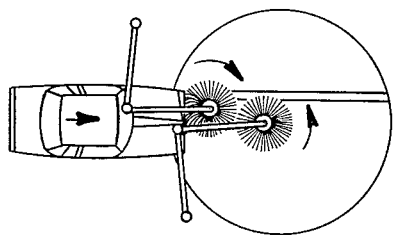
FIG. 4A through 4H are schematic top plan views showing various stages of the scrubbing of a vehicle with rotary brushes mounted to articulated arms.
Figure 4B:
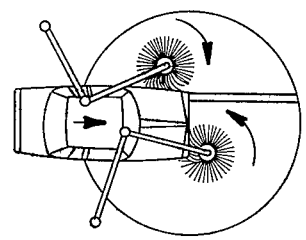
Figure 4C:
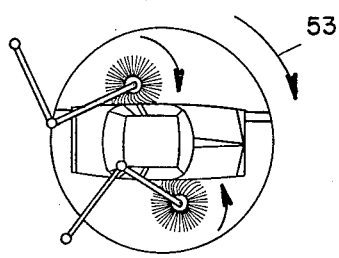
Figure 4D:
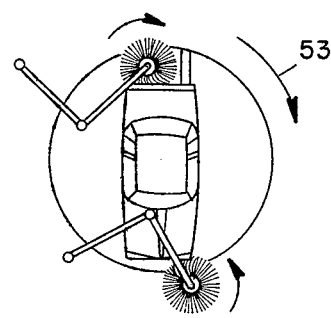
Figure 4E:
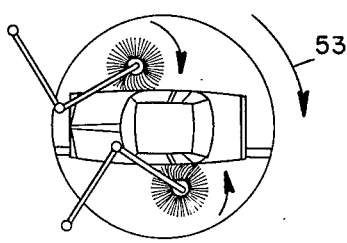
Figure 4F:
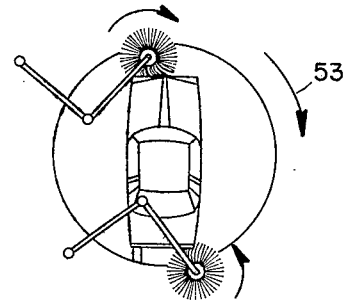

The operation of the embodiment of FIG. 4 is illustrated in FIGS. 4A through 4H and commences with movement of the car onto the turntable, either by driving it on or by the use of a conveyor, as described above for the first embodiment. As shown in FIG. 4A, the brushes 46 and 48 are in substantially the same positions as they are in the embodiment of FIG. 3A. They are both rotating in the same directions as in FIG. 1, ie. clockwise for brush 46 and counter-clockwise for brush 48. As the car moves onto the turntable with the front end, hood and windshield having been scrubbed by the strips 24 at the entrance to the turntable, both brushes have been moved forward and outward in essentially the same way and to the same extent as in the embodiment in FIG. 1 as shown in FIG. 4B. The springs 78 and 84 keep the two arms in the right-angle relationship. When the car is fully on the turntable as shown in FIG. 4C, brush 48 has been moved around the right front corner to the right front side of the car. Then the turntable is started rotating in the clockwise direction. Although there is a possibility of some folding of the arm 64 at this time, the rotation of the bristles against the vehicle in a direction tending to crawl around the front end in a relative direction from the right toward the left as the bristles move from the left toward the right against the surface, will tend to open up the arm assembly to its normal right-angle relationship. Then the brush moves around the front end as the brush 46 moves around the rear end such as shown in FIG. 4D.

The brushing continues as the turntable turns, and brush 46 begins moving across the front end from right to left as the bristles move relative to the front end in a right to left direction. This continues to maintain the normal right-angle relationship of the primary and secondary arms 61A and 61B. Then, as the car turns to the 270 degree position shown in FIG. 4F, it pushes brush 48 back out toward the side of the vehicle path and may cause some slight folding of the arm assembly 64, although the direction of the brush rotation shown in FIG. 4F, and the spring 84, will likely maintain the normal right-angle relationship between the primary and secondary arms 64A and 64B.

Figure 4G:
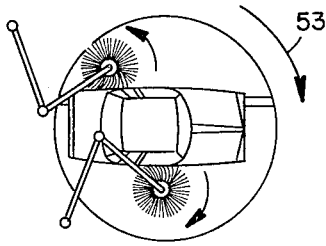
Figure 4H:
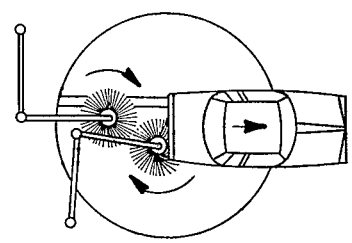

Then, the car is returned the 360/0 degree turntable position. As soon as this movement ceases, the rotation of brush 46 is reversed so that it now rotates counter clockwise. This is shown in FIG. 4G. As it does so, any relative movement between it and the body side is from rear toward front whereupon the brush will crawl along the side of the car toward the rear end and, as it does so, the arm assembly 61 will begin to collapse about the hinge 62 as shown in FIG. 4G. When it reaches the rear end of the car, this rotation of the brush will continue and cause the brush to crawl across the rear end of the car from the left toward the right, whereby the rear end of the car is brushed again as the car leaves the turntable. Similarly, rotation of brush 48 will be reversed as shown in FIG. 4G so that it then rotates clockwise and moves relative to the car side from rear toward and it crawls along the side of the car toward the rear end until arm 64A returns to home position. Then, when the rear end of the car reaches the brush as the car is moved off the turntable, the brush will crawl across the rear of the car, and the return spring 84 will simultaneously unfold the arms so the brush can move across from the right toward the left as the primary arm 64A remains at home position. In this way, both of these brushes can give the rear end of the car a second brushing. This may be particularly helpful with van or station wagon bodies.

For both embodiments of the present invention, a brush unloading or "crush" control is provided. For example, with reference to embodiment of FIG. 1, there is shown schematically a hydraulic power source 86 supplying the arm loading hydraulic cylinder 27 is indicated schematically by line 87, and supplying the brush drive motor 33 as indicated schematically by the line 88, both supplies being through an adjustable flow control valve 90. The same kind of arrangement is provided for supplying the brush drive motor 41 as by supply line 89, and arm loading cylinder 51 as by line 91, both through adjustable flow control valve 85. If the pressure in motor line 89 rises too high, indicating excessive crush of the brush against the vehicle surface, the pressure in line 91 will likewise rise and open a spring loaded vent 92 to reduce pressure on the cylinder 51. The pressure applied to motor 89 is not excessively reduced, because of a restriction in line 91 at 93. A similar arrangement can be provided at 92A and 93A for cylinder 27. It should be understood that the hydraulic lines shown in FIG. 1 for this purpose are strictly illustrative of the principal, and that return lines and refinements are omitted for simplicity. Additional details of similar crush control features can be found in my above mentioned patents and in a U.S. Pat. No. 3,443,270 issued May 13, 1969 to Earl Dallas Smith. Crush control is also provided in the embodiment of FIG. 4A and illustrated symbolically in the same way. The reversal of the brushes for the embodiment of 4A may be achieved by use of alignment sensors 94 and 96 on the turntable and foundation, cooperating upon realignment after the turntable has rotated 360 degrees, a stop turntable rotation and reverse brush rotation until the car has been removed from the turntable. Then, following return of the primary arms to home position, sensed by home position sensor switches 97 and 98, and return of secondary arms to 90 degree position sensed by limit switches 97A and 98A (FIG. 4), the operation of pairs 97 and 97A and 98 and 98A will reinstate normal direction of brush rotation. Turntable rotation will not again commence until the wand 52 has been activated by moving another car onto the turntable.

Figure 5:
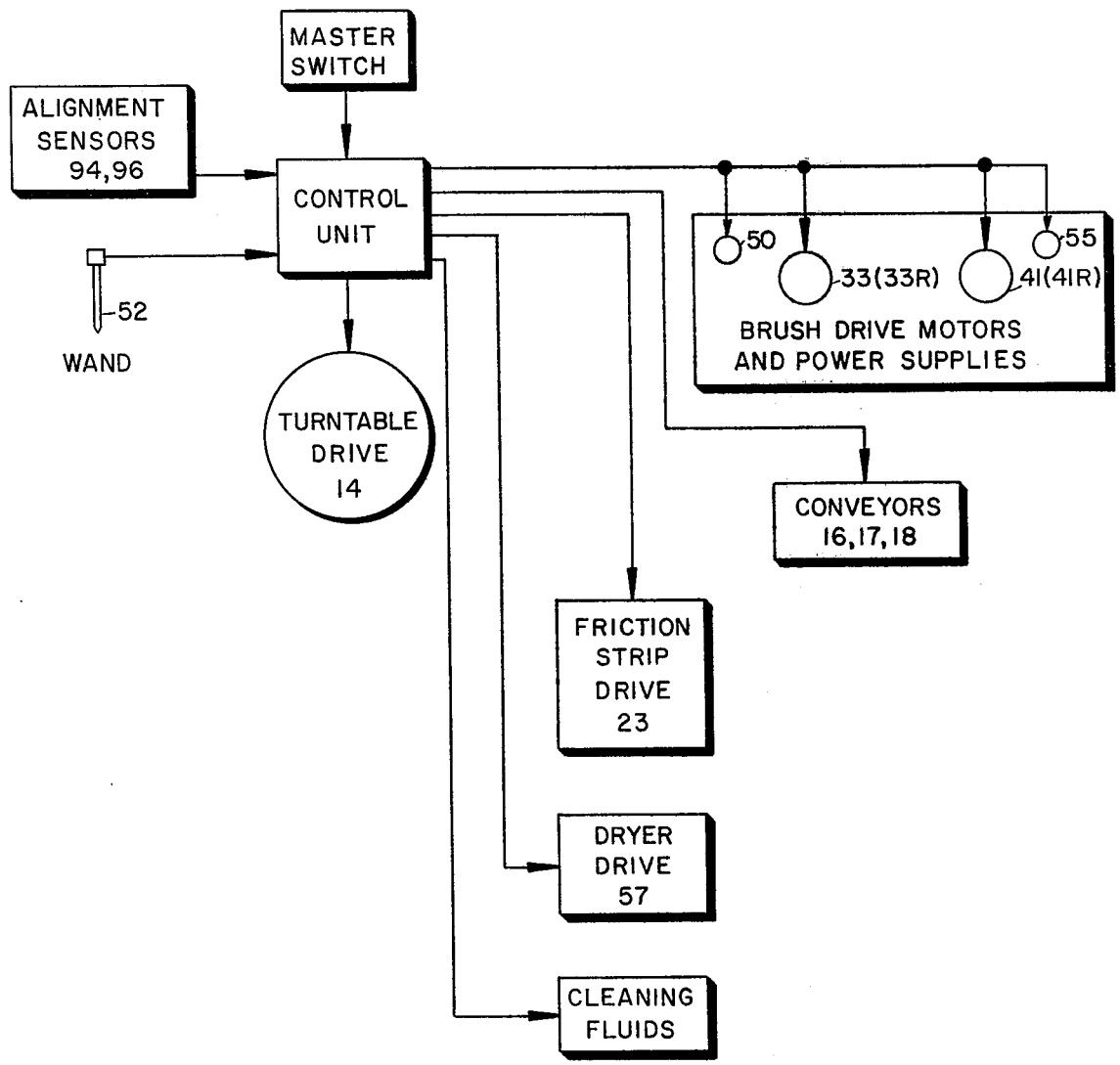
FIG. 5 is a block diagram of the overall apparatus.

It should be recognized that a variety of systems could be employed to implement the arrangement and sequencing of the present invention. For example, electric, pneumatic, or hydraulic drives could be employed for the brushes. Hydraulic, pneumatic, or electric devices could be employed to load and unload the brushes. Therefore the overall system is represented in block diagram form in FIG. 5 where inputs from the wand 52, and such other wands as may be deemed desirable or practical are supplied to a control unit. Similarly, inputs from the alignment sensors 94 and 96 are applied to the control unit, as well as a manually operable master switch input. The appropriate combination of signals is used by the control unit to operate the turntable 14 and converyors 16, 17, and 18. It is believed desirable that the unit is receiving vehicles, the brushes be rotating constantly, as well as the friction strap units and the cleaning fluid supplies. It may be desirable that the dryer be operated only when the turntable has stopped after completion of the washing. Accordingly, the alignment sensor which signifies the achievement of 360 degree rotation, can also be used to start operation of the dryer unit. The power supplies for the brush drive motors may be electric, pneumatic, or hydraulic, as desired and, for the embodiment of FIGS. 4A through 4H, where the brushes are to be reversed, would include the reversing valve or relays or the like.

For the embodiment of FIGS. 1 and 2, it is believed preferable to have the pivot axis about 7 feet from the brush axis and about 8 and ½ feet from a line parallel to the conveyor and through the center of the turntable. The elevation of the pivotal mounting of the brush arms will be determined primarily by the overall height of the vehicles to be washed. A height of from 84 inches to 92 inches may be employed in the majority of instances. Additional brushes and arms may also be employed, particularly if the number of vehicles to be cleaned is unusually high, and if less than one entire rotation of the turntable is desired for entrance and departure of the vehicle. For example, if the the vehicle is to enter at an entrance point, and depart at a point 90 or 270 degrees of turntable rotation from the entrance, it is likely to be desirable to employ more than two brush mounting arm and brush assemblies. The particular nature of the apparatus for washing the top and wheels is not an essential part of the present invention. The laterally moving friction strips are mentioned above for washing the top surfaces. There are also devices which will move such friction strips in a fore and aft manner of scrubbing, and which could be used for top surfaces. An overhead brush at the entrance could also be used. For wheel washing, brushes could be employed on the turntable itself as shown in FIG. 10 of my above mentioned U.S. Pat. No. 3,797,059. It should be also realized that the present invention could be implemented without a rotating turntable, but with the brush arm pivots mounted to a rotating overhead structure mounted on the superstructure. The turntable approach seems preferable.

While the invention has been disclosed primarily as employing rotary brushes with bristles, it should be understood that devices other than bristles, as such, might also be used. For example, there are devices known as "bristles" by the names of "Circuleen" which are hollow members of polyethylene or polypropylene, "Pex" which are solid members of polyethylene or polypropylene, with elongate ribs radially projecting therefrom. On the other hand, other friction devices which may not commonly be referred to as bristles but which are to be included within the scope of the expression as used in claims hereinafter, would use felt strips rather than extruded polyproylene, for examples. It should also be understood that nylon or other materials might also be used for the bristles or strips or other friction devices.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A method of scrubbing the exterior of a vehicle comprising the steps of:
   moving the vehicle onto a turntable;
   applying powered scrubbing means to a front end portion of the vehicle as the vehicle is moved onto the turntable and thereby power scrubbing the front end portion of the vehicle as it is moved onto the turntable;
   rotating the turntable to rotate the vehicle; and
   power scrubbing side and rear portions of the vehicle with the same powered scrubbing means as the vehicle is rotated.

2. The method of claim 1 and further comprising the steps of:
   removing the vehicle from the turntable; and
   power scrubbing a rear end portion of the vehicles as the vehicle is removed from the turntable.

3. A method of scrubbing the exterior of a vehicle comprising the steps of:
   moving the vehicle onto a turntable;
   power scrubbing a front end portion of the vehicle as it is moved onto the turntable;
   rotating the turntable to rotate the vehicle; and
   power scrubbing side and rear portions of the vehicle as the vehicle is rotated; and wherein:
   the scrubbing as the vehicle is moved onto the turntable is done by wiping bristles of a first brush along said front end portion in a relative direction away from the center of the front end portion, as the brush itself is moved in a relative direction away from said center; and
   said bristles are then wiped along the left side of the vehicle in a relative direction toward the rear end of the vehicle and the brush itself is moved in a relative direction toward the rear end of the vehicle.

4. The method of claim 3 wherein said power scrubbing of side and rear portions of the vehicle includes:
wiping said bristles across the rear end portion of said vehicle in a relative direction from the vehicle left side toward the vehicle right side while the brush itself is moved in a relative direction from the vehicle left side toward the vehicle right side; and
then wiping said bristles along the right side of the vehicle in a relative direction toward the front end of the vehicle as the brush itself is moved in a relative direction toward the front end of the vehicle.

5. The method of claim 4 and further comprising the step of:
wiping said bristles across the front end of the vehicle in a relative direction from the right side toward the left side as the brush itself is moved across the vehicle front end in a relative direction from right side to left side of the vehicle.

6. The method of claim 5 wherein:
said turntable is rotated in a clockwise direction as said bristles are wiped across the front and rear end and along the left and right sides.

7. The method of claim 6 wherein:
the bristles are swung in a horizontal direction clockwise around a vertical axis at a rotational speed considerably higher than the rotational speed of said turntable during said wiping.

8. The method of claim 7 wherein:
fluid cleaning material is applied to said vehicle during said scrubbing.

9. The method of claim 3 wherein:
the scrubbing as the vehicle is moved onto the turntable is done by wiping bristles of a second brush along said front end portion in a relative direction away from said center and toward the right side of the vehicle as the first brush is moved in a relative direction toward the rear end; and
said second brush bristles are then wiped along the left side in a direction toward the front end of the vehicle and the second brush itself is moved in a relative direction toward the rear end of the vehicle.

10. The method of claim 9 wherein said power scrubbing of side and rear portions further includes:
wiping said second brush bristles across the rear end of said vehicle in a relative direction from the right side toward the left side, while said second brush is moved across the rear end in a relative direction from the left side to the right side of the vehicle; and
then wiping said second brush bristles along the right side of the vehicle in a direction toward the rear end of the vehicle as said second brush itself is moved in a relative direction toward the front end of the vehicle.

11. The method of claim 10 and further comprising the step of:
removing the vehicle from the turntable; and
power scrubbing the right and left sides of the vehicle as it is removed from the turntable by wiping the first set of bristles along the left side in a relative direction from the front toward the rear of the vehicle as the brush itself is moved in a relative direction from the front toward the rear of the vehicle; and
wiping the second brush bristles along the right side of the vehicle in a relative direction from the front toward the rear as the brush itself is moved in a relative direction from the front to the rear of the vehicle as the vehicle is removed from the turntable.

12. The method of claim 4 in further comprising step of:
reversing rotation of the brush and wiping said bristles across the front end of the vehicle in a direction from the right side toward the left side as the brush is moved across the front end from the right to the left relative to the vehicle; and
maintaining the reversed rotation of the brush as the bush itself is moved in a relative direction from the left front end toward the rear of the vehicle; and
moving the vehicle off the turntable and wiping said bristles across the rear end of the vehicle in a relative direction from the right side toward the left side as the brush itself is moved in a relative direction from the left side toward the right side of the vehicles as the vehicle moves off the turntable.

13. The method of claim 12 and further comprising the step of:
wiping an additional set of bristles across the rear end of the vehicle in a relative direction from the left side toward the right side as a brush having the additional set of bristles thereon is moved across the rear end of the vehicle from the right side toward the left side as the vehicle is moved off the turntable.

14. Vehicle washing apparatus comprising:
a turntable having a vertical rotational axis;
first and second overhead pivots generally above the turntable;
first arm means connected to said first pivot to pivot on a first vertical pivot axis;
first brush means supported on said first arm means near a distal end of said first arm means;
said first brush means being powered for rotation on a first brush axis;
second arm means connected to said second pivot to pivot on a second vertical pivot axis;
second brush means supported on said second arm means near a distal end of said second arm means;
said second brush means being powered for rotation on a second brush axis;
said pivots being above points on opposite sides of a path of a vehicle onto said turntable, and said first pivot being nearer an entrance point on said path than said second pivot, with said brush axes being in home locations near the longitudinal center of said path, and said first brush means nearer than said second brush means to said entrance point.

15. Vehicle washing apparatus of claim 14 and further comprising:
conveyor means on said turntable for moving said vehicle in said path onto said turntable.

16. The vehicle washing apparatus of claim 14 wherein:
the near center positions of said brush axes are home positions of said brushes,
said bristles being swingable on said arm means about said pivot axes and away from said home positions;
said apparatus further comprising fluid pressure actuator means urging said arm means in brush homing directions;

said apparatus further comprising first and second fluid drive motors coupled respectively to said first and second brushes and respectively to said first and second actuator means, said actuator means being responsive to increased and decreased load on motors coupled thereto to respectively reduce and increase the homeward urging force of said actuator means.

17. The vehicle washing apparatus of claim 14 wherein:

said arm means are articulated, there being a first hinge in said first arm means between said first pivot and said first brush axis whereby said first arm means is divided into a first primary arm connected to said first pivot, and a first secondary arm connected to said first primary arm at said first hinge and having said first brush axis adjacent the distal end of said first secondary arm; and there being a second hinge in said second arm means between said second pivot and said second brush axis whereby said second arm means is divided into a second primary arm connected to said second pivot and a second secondary arm connected to said second primary arm at the second hinge and having said second brush axis adjacent the distal end of said second secondary arm; and said primary and secondary arms of each arm means have a normal inter-relationship of about a ninety degree angle between each other but are relatively movable about their hinges for folding into an acute angle relationship between each other; and return means are coupled between said primary and secondary arms to urge them toward their normal relationship.

18. The vehicle washing apparatus of claim 17 wherein:

said parimary arms normally extend perpendicular to the said path of a vehicle onto said turntable, and said hinges are generally in longitudinal alignment over the center of the path, said hinges having vertical hinge axes above said turntable.

19. The apparatus of claim 17 wherein:

said pivots are located so their said pivot axes are stationary in space, and said arms and hinges and pivots are located and said arms are stopped for swinging of said secondary arms on said primary arms about said pivot axes and folding action of said secondary arms on said primary arms primarily within an imaginary cylinder defined by an upward projection of the radially outermost margins of the turntable as the turntable rotates through 360 degrees about its said rotational axis.

20. The apparatus of claim 19 wherein:

said powered brush means include reversible brush-drive motors; and said return means include return spring means.

21. The apparatus of claim 14 or 19 and further comprising:

window brush means mounted on said arm means for rotation on substantially horizontal axes above said first and second brush means.

22. The apparatus of claim 14 or 19 and further comprising:

powered return means coupled to said arm means and normally urging said arm means in a direction to cause said brush axes to be in said home locations.

23. The apparatus of claim 22 wherein:

said powered brush means are coupled to said powered return means to control crush of said brush means against surfaces of vehicles while engaged and brushed by said brush means.

* * * * *